United States Patent [19]

Cronin

[11] 4,401,938

[45] Aug. 30, 1983

[54] VARIABLE-SPEED DRIVE FOR CONTROL OF INDUCTION GENERATORS

[75] Inventor: Michael J. Cronin, Sherman Oaks, Calif.

[73] Assignee: Lockheed Corporation, Burbank, Calif.

[21] Appl. No.: 220,865

[22] Filed: Dec. 29, 1980

[51] Int. Cl.³ .................. F02N 11/00; H02P 9/06; H02P 9/46; H02P 15/00

[52] U.S. Cl. ...................... 322/29; 290/38 R; 322/32; 322/40; 322/47

[58] Field of Search .............. 322/47, 40–42, 322/29, 32, 10; 290/38 R, 46 R

[56] References Cited

U.S. PATENT DOCUMENTS

| | | | |
|---|---|---|---|
| 2,077,768 | 4/1937 | Perry | 172/293 |
| 2,153,252 | 4/1939 | Hunsdorf | 172/239 |
| 2,359,886 | 10/1944 | Wikkenhauser | 322/47 X |
| 2,449,905 | 9/1948 | Lotts et al. | 322/40 X |
| 2,810,844 | 10/1957 | Morrill | 310/83 |
| 2,990,503 | 6/1961 | Clark | 318/11 |
| 3,032,696 | 5/1962 | Payne et al. | 318/11 |
| 3,809,914 | 5/1974 | Kilgore et al. | 322/29 X |
| 4,330,743 | 5/1982 | Glennon | 322/29 X |

*Primary Examiner*—R. J. Hickey
*Attorney, Agent, or Firm*—Lowell G. Turner

[57] ABSTRACT

The invention is an aircraft power generation system which utilizes an induction-machine ($G_1$) as a primary generator of variable-voltage/variable-frequency power. The induction-machine ($G_1$) is directly driven by the engine (14) and is excited by an excitation-generator ($G_2$) such that the induction-machine ($G_1$) operates in a generating mode. A variable-speed drive (20), shown as a toroidal drive (30), controls the excitation frequency of the induction-machine ($G_1$) such that the negative slip-frequency is controlled as a function of the input speeds ($N_1$), ($N_2$) and the electric load on the generator. Control of the toroidal drive (30) and thus speed ($N_2$) is accomplished by a negative-slip control circuit which includes a drive control logic circuit (36), a proportional actuator (34), a control-start panel (48), and a steering mechanism (32).

In another aspect of the invention, the induction-machine ($G_1$) operates in a start-mode to start the engine (14). In this mode of operation, after engine starting is initiated from control-start panel (48), a start-logic circuit (52) establishes a programmed voltage/frequency output from a start-power electronics source (46). The voltage/frequency output, programmed from a low value, against time, up to a predetermined high value is applied to the induction-machine ($G_1$) field to bring the engine (14) up to speed.

20 Claims, 4 Drawing Figures

VARIABLE-SPEED DRIVE FOR CONTROL OF INDUCTION GENERATORS

TECHNICAL FIELD

The invention relates generally to the utilization of an induction generator as a primary source of power in an aircraft environment, and more specifically, to a simple approach to an electron-mechanical variable-speed drive which controls the excitation frequency of the induction generator in such a way that negative slip-frequency is controlled as a function of the input (engine) speed and the electric load on the generator.

BACKGROUND AND BACKGROUND ART

Aircraft generator systems have typically been adversely impacted by the speed range of the engines. As a consequence, sophisticated and complex speed control methods have been adopted to maintain the generator at a constant speed over the speed range of the engines, or complex electronic power converters have been used to convert the variable frequency power output of the generator to constant frequency power.

The trend toward "all-electric" airplanes and "all-electric" environmental control systems will most probably necessitate the selection of generators of large capacity; e.g., 250 to 500 kva generators. As a consequence, it would be very penalizing for a conventional type constant speed drive, or a variable speed constant frequency system, to maintain constant output power over the full speed-range of the engines. Aside from the torque and current sizing problems that impact on weight and size, there is the question of fuel-efficiency, which is impacted by the overall transmission efficiency. On the other hand, as has been described in co-pending U.S. patent application Ser. No. 173,111, filed July 28, 1980, for "A Direct-Driven Aircraft Generating System Providing Variable and Constant Levels of Electric Power", assigned to the assignee herein, the majority of the loads in a typical large aircraft can be powered by a generator system, whose voltage and power is proportional to frequency (engine speed).

In addition, it would be highly desirable to utilize squirrel-cage rotor induction generators, which are extremely rugged and reliable machines, to provide power to the majority of loads. Such generators use relatively inexpensive materials in the rotor, and they can normally be easily fabricated. There are, however, also certain problems associated with induction generators. First, to operate as a generator, the rotor must be driven above its synchronous speed; i.e., in a negative-slip condition. Second, the machine cannot operate as a generator unless there is at least one synchronous generator available in the system to excite it. In addition, the machine cannot supply either its own excitation or (lagging) reactive kilovars.

It is a primary object then, of the present invention, to provide a drive mechanism of minimum weight and complexity, which will control the excitation frequency of an induction-machine and cause it to operate in a generating mode.

It is a further object of the present invention, to provide a multi-generator aircraft power generation system that includes an induction-machine for providing primary power, an exciter machine, and a differential variable-speed drive that controls the negative slip frequency between machines as a function of the input speed and the electric load on the induction machine.

It is yet another object of the present invention to provide a power generation system, particularly for aircraft, that utilizes an extremely reliable induction machine as a power generator within the system.

It is a further object of the present invention, to develop a novel drive and a multi-machine power system which utilizes at least one minor synchronous machine in conjunction with a primary induction machine.

These and other objects of the present invention will become more readily apparent after a full consideration of the following description of the instant invention, and the several advantages thereof enumerated herein.

A variety of differential and variable-rate transmission and drives utilized in conjunction with electric machines are known in the prior art. Such drives are typified by those disclosed in U.S. Pat. Nos. 2,810,844 to Morrill; 3,032,696 to Payne et al; 2,077,768 to Perry; 2,990,503 to Clark; and 2,153,252 to Hunsdorf.

In the U.S. Pat. No. 2,810,844 patent, a constant speed drive type system is disclosed which uses a differential planetary gear arrangement to control the frequency of a dynamoelectric machine and to derive a modified selected frequency different from the base frequency of the machine, while the U.S. Pat. No. 3,032,696 patent discloses an engine driven generator/motor that includes a variable-rate transmission interposed between the engine and generator. The drive system includes bi-directional (overrun) clutches to prevent direct drive of the transmission in the generator mode, and gear-reduction in the motor (start) mode. In addition, a current sensing control (current-transformer) is used to monitor and control the power taken by the motor/generator.

A synchronous drive system is disclosed in the U.S. Pat. No. 2,077,768 patent, wherein a frequency changer is driven at a variable speed and rotary induction machines are electrically "locked in step" with the frequency generator. In this particular system, the machines operate at the speed of the frequency generator. The U.S. Pat. No. 2,990,503 patent, by contrast, describes a two directional power flow system that utilizes multiple devices such as a vari-drive, directional clutches, synchronous motor/generator, etc. In this system, the synchronous machine is automatically controlled when in a driving mode of operation, such that the ratio change in the drive gears is adjusted in dependence upon the torque and power of the driving motor, as ascertained by the magnitude of the current drawn by the machine. The system operates to maintain the magnitude of the current at a predetermined level.

Finally, a vari-drive toroidal-type transmission is shown in the U.S. Pat. No. 2,153,252 patent, driving an alternating current motor. The transmission allows for the supplying of power at various selective amounts from a constant speed motor, and provides a means for varying the proportionate actual speeds of rotating field and armature members of an electric machine.

All of the aforementioned prior art patents are directed to power systems quite different from the differential drive system for frequency control of an induction generator, as described by the present invention. None of these patents disclose or suggest an electromechanical differential drive which controls the excitation frequency of an induction generator in such a way that the negative slip-frequency is controlled as a function of the input (engine) speed and the electric load on the generator while the generator speed and voltage are not controlled to a fixed per unit value.

A somewhat simple system which utilizes a synchronous generator as an exciter for an induction generator is disclosed in co-pending U.S. patent application Ser. No. 220,371, for "Induction Generator/Dual-Samarium-Cobalt Generator Combination", assigned to the assignee herein. The exciter generator and induction machine disclosed therein are driven through a fixed ratio gear system which causes the exciter generator to run at a slower speed relative to the induction machine. Under this arrangement, the induction machine operates as if it is in an overspeed condition and functions in a generator mode. While this relatively non-complex system is quite desirable for certain uses, it is somewhat limited in that it is insensitive to the different loads that may be imposed on the induction generator. By contrast, the present power system, while utilizing a highly desirable induction generator as a primary source of power, also provides the added feature of being able to adjust the slip frequency. This flexibility is particularly desirable when the power system is utilized in aircraft, where loads typically may vary a great deal. The ability to vary the slip frequency tends to prevent the induction machine from dissipating too much heat on the windings because of current flows higher than necessary.

The disclosures of the aforementioned prior art U.S. patents and copending patent application are hereby incorporated herein by reference.

DISCLOSURE OF INVENTION

The differential drive for frequency control of an induction generator in accordance with the present invention comprises a vari-drive mechanism interposed between an aircraft engine drive and a permanent magnet rotor. The permanent magnet rotor forms part of an excitation generator that excites an induction machine which is directly driven by the engine, such that the induction machine operates in a generating mode. The differential drive controls the excitation frequency of the induction generator in such a way that the negative slip-frequency is controlled as a function of the input (engine) speed and the electric load on the generator.

In a preferred embodiment, the variable-speed drive mechanism that drives the excitation generator comprises a toroidal drive having input and output toroids with rollers interposed therebetween. A drive control logic system monitors load parameters and the induction generator and excitation generator speeds, and then computes the negative slip as a function of load. Desired increases and decreases in speed of the output-toroid, and the exciter generator speed, are controlled by "steering" the rollers by means of a proportional linear or rotary actuator.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BEST MODE OF CARRYING OUT THE INVENTION

Figure 1:
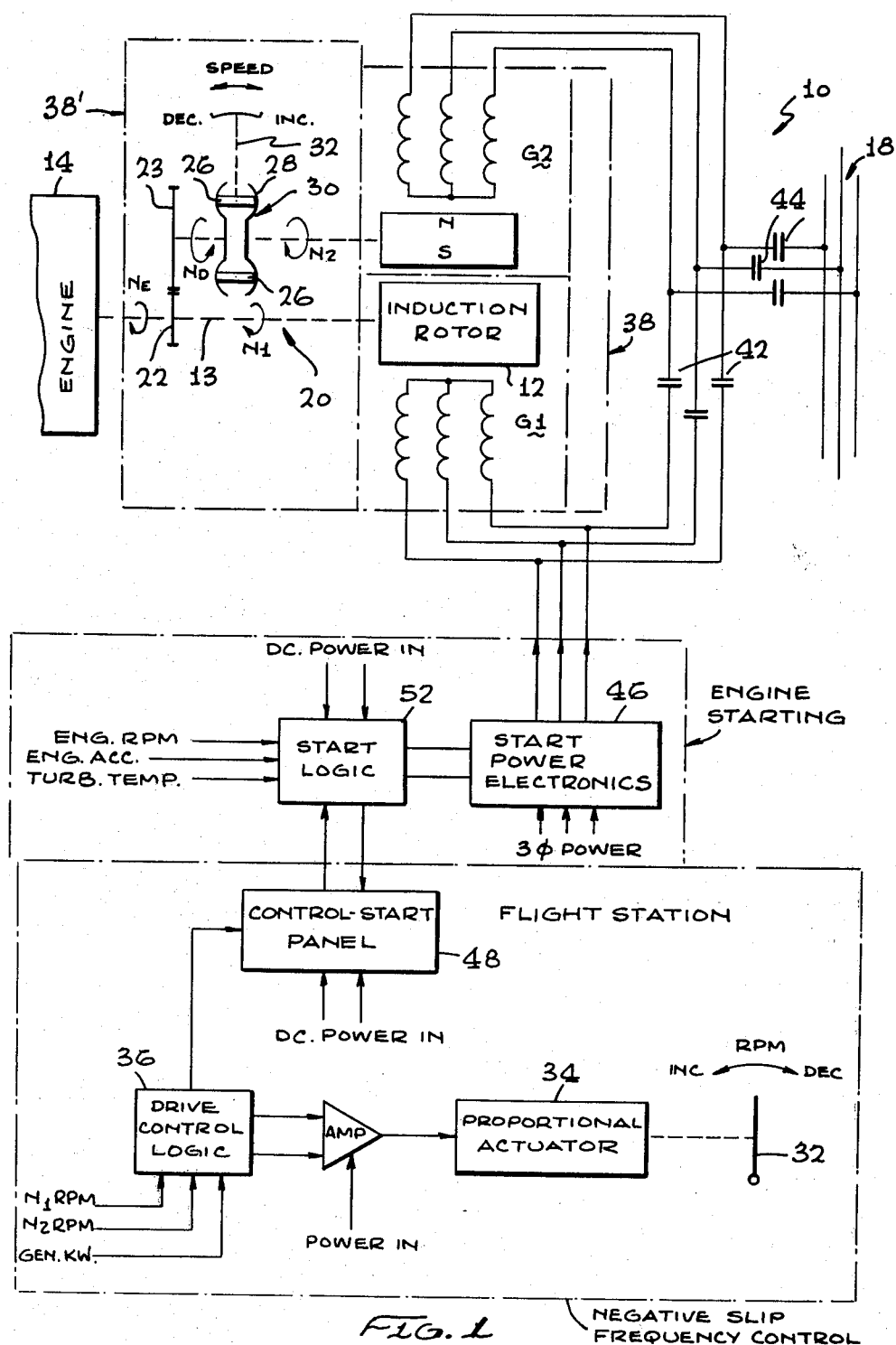
FIG. 1 is a schematic representation of a power generation system in accordance with a preferred embodiment of the present invention.

As is well known to those versed in the theory of induction motors, an induction-motor only becomes a generator when its rotor is driven above the normal synchronous speed; i.e., it is in a "supersynchronous" state or in a condition of "negative-slip". FIG. 1 depicts an aircraft power generation system (10) which utilizes an induction-machine ($G_1$) as both an engine starter and a generator for primary variable voltage/variable frequency power for the appropriate aircraft's system loads. This means that the induction rotor (12) EMF's and currents are reversed and are anti-phase to those in the motor mode. This relationship is illustrated in the two vector diagrams, FIGS. 2A and 2B.

Figures 2A, 2B:
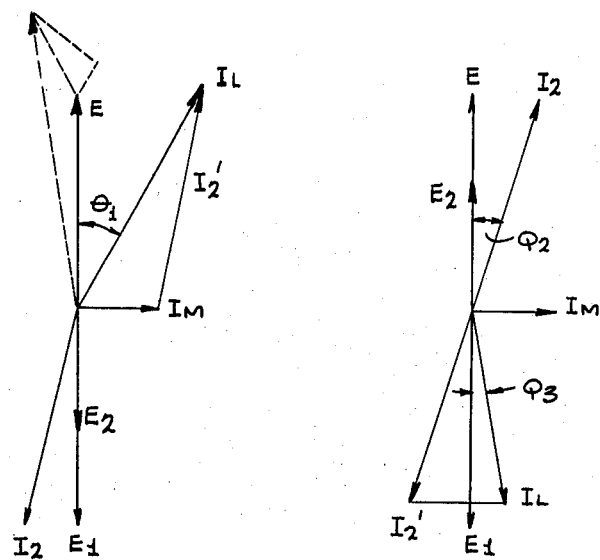
FIGS. 2A and 2B are vector diagrams illustrating the principles underlying operation of the induction-generator system of the present invention.

Referring now to FIGS. 2A and 2B, the vectors therein show that, in FIG. 2A, the line-current, ($I_L$), lags behind the primary induced voltage by $\theta_1$ degrees: the power converted to mechanical output is therefore $EI_L \cos \theta_1$. In FIG. 2B, however, the rotor emf, ($E_2$), is reversed but the rotor-current, ($I_2$), still lags on it by an angle of $\theta_2$ degrees. But ($I_L$) is now leading on the primary induced voltage, ($E_1$), by $\theta_3$ degrees, and the machine is now in a generating mode; with power equal to $E_1 I_L \cos \theta_3$. Also, the ($I_L$) current, the stator current, leads the primary induced emf by $\theta_3$ degrees. This typifies the characteristic that induction generators cannot provide a lagging current-as demanded by the excitation and any induction loads. Consequently, a synchronous-generator must supply these reactive kilovars.

Figure 3:
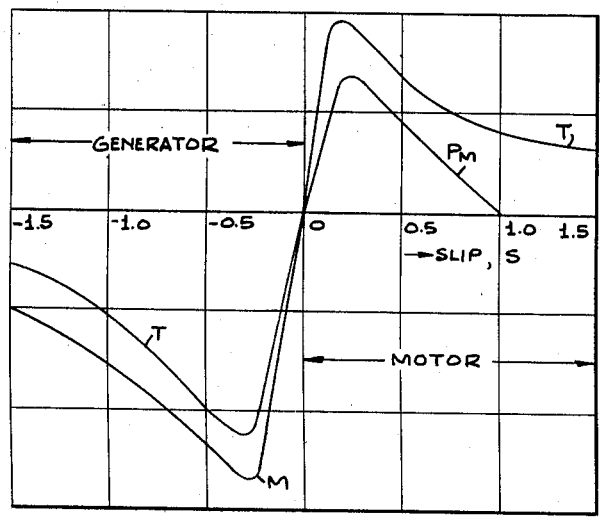
FIG. 3 is a plot of mechanical power and torque curves showing the change in these curves with positive and negative values of slip.

FIG. 3 is of interest in that it shows the change in mechanical power and torque curves, with positive and negative values of slip; i.e., the motoring and generating modes of the induction machine. It can be seen that changes in torque and power, in both modes of operation, can go from 0 to a maximum over a small change in slip. Thus, the function of the variable-speed drive (20) of the present invention basically involves controlling the negative slip, ($-s$), when the induction-machine ($G_1$) is operating in the generating mode.

Returning to FIG. 1, the induction rotor (12) is shown directly-driven at speed ($N_1$) by the shaft (13) of an engine (14). A synchronous excitation rotor (16), forming part of a synchronous excitation generator ($G_2$), is driven via a variable-speed drive (20) at a speed ($N_2$). If the ratio of the induction rotor (12) to excitation rotor (16) speeds were set by fixed-ratio gears, as in the aforementioned copending U.S. patent application Ser. No. 220,371, so that the induction rotor speed ($N_1$) was higher than the excitation rotor speed ($N_2$), then the induction-machine ($G_1$) would be in a generating mode. Also, the power delivered to the bus (18) by the induction-machine ($G_1$), now an induction generator, would be proportional to the negative slip.

Since the synchronous excitation generator ($G_2$), preferably a permanent magnet generator, generates voltage proportional-to-frequency, the magnitude of the stator-flux of induction-machine ($G_1$) would be nominally constant. Also, the synchronous excitation generator speed ($N_2$) would establish the line frequency of the induction-machine, ($G_1$). Thus, the induction-machine ($G_1$) would operate in a variable-voltage/variable-frequency generator mode over the input speed range, with its power-capability being dictated by the negative-slip. A basic function then, of the differential drive (20), is to control the slip to match the loads.

The control aspects of FIG. 1 illustrate the manner in which the speed ($N_2$) of the excitation rotor (16), and therefore the frequency of the synchronous excitation generator ($G_2$), can be controlled. The control insures that the induction-machine ($G_1$) operates at different negative-slip values that are proportional to the real loads encountered. As shown therein, although not critical, the speed ratio, or gear ratio between gears (22) and (23), may be approximately 1:1 so that the speed ($N_D$) to the driven or input toroid (24) is approximately the same as the engine input speed ($N_E$). However, steering of the rollers (26) of the toroidal drive (30) makes it possible for the driven (output) toroid (28) to be driven at speeds above and below the input toroid speed ($N_D$). Therefore, if the drive-ratio were such that the negative slip ($-s$) lies 50% along the torque-speed curve of FIG. 3, then by controlling the angle of the rollers (26), the slip can be changed between a range, for example, between 0 and $-0.12$ PU (power unit), by small angular-changes of the rollers (26).

The lower portion of the FIG. 1 schematic shows a typical control embodiment for the toroidal drive (30). Increases and decreases in the speed ($N_2$) of the output-toroid (28) are shown controlled by a steering mechansim (32) which can alter the speed ($N_2$) by increasing or decreasing the angle of the toroid drive rollers (26). The steering mechanism (32) is shown as being operated by means of a known proportional linear or rotary actuator (34), the details of which do not form an essential part of the present invention. The drive control logic (36) monitors the ($N_1$) and ($N_2$) rotor speeds and computes the negative slip, as a function of load, around the per unit frequency established for induction-machine (generator) ($G_1$). The output current from the induction-machine (generator) ($G_1$) is conveyed via current transformers (not shown) to the drive control logic (36). When the desired slip-function is derived, the position/rate control is balanced (electrically-nulled) and the output is held in that steady-state condition.

It is contemplated that the induction-machine ($G_1$), and the synchronous excitation generator ($G_2$), could be combined in a single housing, represented by dashed line (38), in similar fashion to the single housing-dual generator arrangement depicted in the aforementioned co-pending U.S. patent application Ser. No. 220,371. In like fashion, it would readily be possible to enclose the variable-speed drive (20) within the housing, represented by dashed line ($38^1$), or in a separate unit attached to the housing (38).

The FIG. 1 schematic shows an induction-machine (generator) ($G_1$) as the main power generation machine. In relation to present and future provided aircraft power systems and requirements, such a machine could well be a 250 kva machine. The output rating of the synchronous excitation generator ($G_2$) however, will only be that dictated by the magnetizing kilovars and the load kilovars (if any). With a purely resistive-load on induction-machine ($G_1$), the power of the load would decrease proportionally with voltage-squared. Therefore, as the per unit frequency decreases, the value of negative-slip would also have to decrease to match the decreasing electric load: these loads would decrease less when they are made up of resistive and motor loads.

Another advantage of the present invention is that the synchronous excitation generator ($G_2$) may be used as an emergency back-up generator. This backup can be accomplished by opening the three-phase contactor (42), thereby removing excitation power from induction machine ($G_1$). When the induction-machine ($G_1$) is operating as an induction-generator, the three-phase contactors (42) and (44) are closed.

In yet another aspect of the instant invention, the power generation system (10) can be utilized to start the aircraft engine (14). To carry out this function, the induction machine ($G_1$) is used in a motor-mode of operation by supplying it with a programmed voltage and frequency from the power electronics source (46). In this mode of operation, the three-phase contactors (42) and (44) are both open. After the pilot engages the start mode at the flight station via the control-start panel (48), the start logic control circuit (52) receives a signal from the control-start panel (48) and programs the voltage and frequency of the power output of the power electronics source (46). By programming the output of the power electronics source (46) the output frequency is automatically increased and the voltage/frequency ratio is controlled, so that the appropriate torques and acceleration rates are developed to bring the engine (14) up to its self-supporting (ground idle) speed.

In this start mode, the power-electronics source (46) takes the three phase-ac power supplied to it (via the aircraft generators, auxiliary power unit, ground power, or the like), and supplies an especially programmed frequency and voltage to the induction machine ($G_1$). The frequency and voltage applied to the induction-machine ($G_1$) field is preferably programmed from a low value, against time, up to some predetermined high value. The start logic control circuit (52), monitors the engine rpm, acceleration, and turbine temperature so as the engine speed rises, the output voltage and frequency of power electronics source (46) are scheduled up to starter cut-out. The ability of the start logic circuit (52) to schedule the output voltage and frequency, to change with respect to time, enables the engine start time to be maintained constant, regardless of the ambient temperature and other variables.

While the variable-speed drive (20) of FIG. 1 is shown utilizing a toroidal drive, it should be readily apparent that any suitable hydraulic drive, mechanical variable-drive (such as cone-ring drives), slip-clutch drives, etc., may be substituted for the toroidal drive. However, it is preferred to utilize mechanical rather than hydraulic drives since it eliminates the use of pressure pumps, scavenge pumps, filters, etc. Also, relatively recent developments in traction-fluid technology make the use of mechanical type drives a motor viable candidate than was possible hitherto. Specifically, the emergence of new lubrication fluids such as "Santotrac" (produced by Monsanto Chemical Company) make traction-drives much more attractive: such fluids become extremely viscous and almost glasslike under pressure, resulting in a major reduction in Hertz stresses and relief from metal-to-metal contacts.

Though not apparent from FIG. 1, the variable-speed drive (20) and toroidal drive (30) may be relatively compact since the variable-drive only adjust the negative slip frequency. As exemplified by FIG. 3, it can be seen that a very small change in slip frequency can result in a major change in the output of the induction-machine ($G_1$).

The variable-speed drive and control system for frequency control of induction generators of the present invention provides several primary benefits, especially in aircraft installation as follows:

(1) The variable-speed drive (20) provides accurate "negative" slip-control of the induction-machine (generator) ($G_1$), in response to load and speed changes.

(2) The induction-machine ($G_1$) is optimally designed in weight and size, since the minor synchronous excitation generator ($G_2$) excites the induction-machine ($G_1$) with a variable-voltage/variable-frequency power supply.

(3) The power generation system may readily incorporate the obvious desired feature of a 2-in-1 generator design, with or without incorporating all or part of the differential-drive (20).

(4) The minor synchronous excitation generator ($G_2$) can be used as a second or back-up power source to the main induction-generator.

(5) The toroidal drive (30) is connected in the minor synchronous excitation generator ($G_2$) mechanical power-flow channel. It could optionally, be inserted in the main induction-machine (generator) ($G_1$) channel. However, in this arrangement, it would have to transmit the torque of the larger induction-machine ($G_1$).

(6) The main induction-machine (generator) ($G_1$) is designed to provide power proportional to speed, and not constant power over the engine (14) speed range.

(7) The main induction-machine ($G_1$) can be used in the role of a reliable motor-starter.

(8) The role of the variable-speed make-up/subtract drive is small, since it acts only as a "vernier" control of the "negative-slip". As stated hereinabove, while other drives such as electro-hydraulic, hydraulic, induction/eddy-current, and the like type drives can fulfil this role, but the toroidal drive is presently a preferred electromechanical drive.

(9) The toroidal drive (30) has a low power level relative to the power of the main induction-machine (generator) ($G_1$).

It is apparent that there has been provided with this invention a novel variable-speed drive and control system for frequency control of induction generators which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

INDUSTRIAL APPLICATION

The control and variable-speed drive system of the present invention is useful in controlling the frequency of an induction machine so as to cause it to operate in a power generating mode, and finds particular use in aircraft environments both for provision of power to other aircraft systems and for engine starting.

I claim:

1. A power generating system comprising:
   an induction machine including an induction rotor and a stator;
   mechanical drive means connected to said induction motor for driving said induction machine at a variable speed;
   a synchronous excitation generator coupled mechanically with said induction machine by means of a variable-speed drive, whereby said synchronous excitation generator will provide a variable output voltage and frequency;
   means for applying said variable output voltage and frequency to said stator of said induction machine; and
   drive-logic control means for monitoring the speed and load data of said induction machine and for adjusting and maintaining the speed of said synchronous excitation generator so as to control the negative slip-frequency of said induction machine whereby said induction machine may operate in a generating mode with its output controlled in response to said speed and load data.

2. A power generation system as in claim 1 wherein said synchronous excitation generator includes a permanent-magnet rotor.

3. A power generation system as in claim 1 wherein said permanent-magnet rotor is constructed of samarium-cobalt.

4. A power generation system as in claim 1 wherein said variable-speed drive comprises a toroidal drive arranged to be driven by said mechanical drive means.

5. A power generation system as in claim 1 including an engine arranged as a prime mover for said induction machine, and a housing, said induction machine, mechanical drive, and synchronous excitation generator, all being integrated within said housing so as to be connectable to said engine via a single mechanical interface.

6. A power generation system as in claim 1 wherein said drive-logic control means is adapted to increase said negative-slip frequency in proportion to the kilowatt loading on said induction machine.

7. A power generation system as in claim 1 wherein said drive logic control means and said varible-speed drive are adapted and arranged to maintain the negative-slip frequency constant over the input speed range of said induction machine for any given load.

8. A power generation system as in claim 1 wherein said variable-speed drive comprises a toroidal drive having rollers interposed between input and output toroids, said drive-logic/control system including electromechanical actuator means for adjusting the angular relationship of said rollers.

9. A power generation system as in claim 1 including an engine and an engine starting control system.

10. A power generation system as in claim 9 wherein said engine starting control system includes a start-logic control system adapted to monitor speed, acceleration, and temperature data of said engine.

11. A power generation system as in claim 10 including a power-electronics circuit associated with said induction machine, said start-logic control system being adapted to program said power-electronics circuit whereby said induction-machine is operative as an induction-motor starter for said engine.

12. A power generation system as in claim 11 wherein said power electronics circuit includes means to rectify three phase ac power to dc power and invert said dc power to a synthesized variable-voltage/variable-frequency output.

13. A power generation system as in claim 11 wherein said start-logic control system programs said variable-voltage/variable frequency output to control the gross torque of said induction-motor and the acceleration rate of said induction motor and said engine.

14. A power generation system as in claim 13 wherein said engine is an installed aircraft engine, said engine-starting control system including a flight-station control panel including means for initiating and activating said engine-starting control system.

15. A power generation system for providing a source of variable-frequency/variable-voltage power comprising in combination:
   a drive shaft adapted to be rotated at a variable speed by a source of mechanical power;
   a synchronous generator having a synchronous rotor mechanically coupled to said drive shaft so as to rotate therewith in a variable first rotational relationship and also having a synchronous stator connected to a first set of electrical terminals, the output of said synchronous generator at said first set of terminals having a variable frequency characteristic in accordance with said variable speed of said drive shaft and said variable first rotational relationship;
   an induction generator having an induction rotor mechanically coupled to said drive shaft to rotate therewith in a fixed second rotational relationship and also having an induction stator connected to a second set of electrical terminals, the output of said induction generator having a variable voltage characteristic in accordance with said variable speed of said drive shaft and said fixed second rotational relationship, a frequency characteristic determined by the frequency characteristic of an excitation input applied to said second set of terminals, and a power characteristic determined by the percentage difference between said excitation input frequency characteristic and a synchronous frequency, said synchronous frequency being directly related to the rotational speed of said induction rotor; and
   means for effecting respective direct electrical connections between respective ones of said first and second sets of terminals so that said output of said synchronous generator will serve as said excitation input for said induction generator and the output of said induction generator will thereby have variable frequency and power characteristics in accordance with both said variable rotational speed of said drive shaft and said variable first rotational relationship.

16. A power generation system as in claim 15 wherein said synchronous rotor is arranged to run at a lower rotational speed than that of said induction rotor.

17. A power generation system as in claim 15 wherein said synchronous rotor is constructed at least in part of a permanent magnet material.

18. A power generation system as in claim 17 wherein said permanent magnet material is samarium-cobalt.

19. A power generation system as in claim 15 further including a housing, said induction generator and said synchronous generator being enclosed within said housing.

20. A power generation system as in claim 15 wherein said induction rotor is a squirrel-cage induction rotor and said induction stator is a three-phase stator.

* * * * *